(12) United States Patent
Yoshihiro

(10) Patent No.: US 7,162,638 B2
(45) Date of Patent: Jan. 9, 2007

(54) ELECTRONIC DATA MANAGEMENT SYSTEM AND METHOD

(75) Inventor: Takuji Yoshihiro, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 910 days.

(21) Appl. No.: 09/754,376

(22) Filed: Jan. 5, 2001

(65) Prior Publication Data

US 2001/0018744 A1 Aug. 30, 2001

(30) Foreign Application Priority Data

Jan. 6, 2002 (JP) ............................. 2000-001110

(51) Int. Cl.
- G09C 5/00 (2006.01)
- G06K 9/18 (2006.01)
- G06Q 30/00 (2006.01)
- H04L 9/00 (2006.01)
- G06K 9/00 (2006.01)

(52) U.S. Cl. .................. 713/179; 380/54; 382/103; 382/141; 705/28

(58) Field of Classification Search ................ 713/176, 713/179; 705/26, 27; 380/54
See application file for complete search history.

(56) References Cited

U.S. PATENT DOCUMENTS

| 5,465,299 A | 11/1995 | Matsumoto et al. |
| 5,606,609 A * | 2/1997 | Houser et al. ............. 713/179 |
| 6,052,669 A * | 4/2000 | Smith et al. .................. 705/26 |
| 6,246,778 B1 * | 6/2001 | Moore ........................ 382/103 |
| 2002/0019777 A1 * | 2/2002 | Schwab et al. ............... 705/26 |

FOREIGN PATENT DOCUMENTS

| EP | 0 953 938 A2 | 11/1999 |
| FR | 2 775 812 A | 9/1999 |
| JP | 09198437 A | 7/1997 |

OTHER PUBLICATIONS

"A Watermark for Image Integrity and Ownership Verification" by Ping Wah Wong, IS&T's 1998 PICS Conference, May 17, 1998, pp. 374-379.

* cited by examiner

Primary Examiner—Jacques Louis-Jacques
Assistant Examiner—Matthew Heneghan
(74) Attorney, Agent, or Firm—Birch, Stewart, Kolasch & Birch, LLP

(57) ABSTRACT

An electronic data management system for accurately determining the authenticity of the electronic data and the specification of the source of unauthenticated electronic data. A drawing output processor transmits original electronic drawing data A1 to an order receiving unit with a tag T attached. The order receiving unit and a manufacturing unit transmit a manufacturer's copied data B2(T) copied from the original data A1(T) to an inspection unit. The inspection unit transmits the inspection result Fa for the product M, the client's copied data A2 re-copied from the original data A1, and the manufacturer's copied data B2 (T) to a determination unit. The determination unit compares the tag T extracted from the manufacturer's copied data B2 with the original value of the client's copied data A2 and the original value of the manufacturer's copied data B2 and determines the authenticity of the client's copied data A2 and the manufacturer's copied data B2.

18 Claims, 4 Drawing Sheets

ELECTRONIC DATA MANAGEMENT SYSTEM AND METHOD

BACKGROUND OF THE INVENTION

1. Field of the Invention

This invention relates to an electronic data management system and method, and more particularly relates to an electronic data management system and method capable of determining the authenticity of electronic data.

2. Description of Background Art

When a customer places an order with a manufacturer, products different from a drawing submitted with the order may be delivered. Particularly, when electronic (numerical) data is submitted as the drawings for the ordered products, the following reasons can cause deficient products.

1. A manufacturer has made a mistake in the process of manufacturing the products.
2. A manufacturer has altered the drawings and then manufactured the products according to the altered drawings.
3. A customer has altered the drawings after placing the order.

Whether or not an electronic drawing is altered can be determined by installing an authentication system into both the customer's and manufacturer's computer systems.

An authentication system, for example, as disclosed in Japanese Patent Publication Laid-open No. Hei. 9-198437, is designed to be capable of determining whether or not the electronic document is altered according to authentication information recorded within the electronic document (i.e. electronic drawing) and authentication information recorded in the computers of both the customer and the manufacturer.

However, with the authentication system described above, each time an authentication is executed at each computer system, the authentication information is required to be recorded in a computer and within an electronic document, and the authentication process therefore becomes complicated.

And as this authentication system requires the installation of management functions to record the authentication information in each computer, the configuration of the computer system becomes complicated.

Moreover, this authentication system has difficulty in determining which customer or manufacturer has altered an electronic document in cases where an electronic document is altered after authentication. Therefore, it has been difficult to specify the reasons 1 though 3 above in order to clarify exactly where the responsibility lies for a deficient product.

SUMMARY AND OBJECTS OF THE INVENTION

It is therefore an object of the present invention to set out to provide an electronic data management system and method capable of determining authenticity of electronic data accurately, and capable of specifying the computer system used in changing the electronic data in cases where electronic data is found to be not authenticated, while retaining a straightforward configuration.

Here, a description is given with respect to the numerals shown in the attached drawings to enable ease of understanding. The content of this description is applicable to but not limited to the items to which numerals are attached.

An electronic data management system related to the present invention (10) is an electronic data management system (10) for using electronic data mutually among a plurality of computer systems classified into at least two groups, wherein a reference characteristic value extracting means extracts a reference characteristic value (H1) from copied electronic data (B2(T)) to which a reference characteristic value (H1) calculated from an original electronic data (A1) is attached, comparison subject characteristic value calculating means calculates comparison subject characteristic values (H2, H3) from the copied electronic data (B2) and/or electronic data (A2) recopied from the original electronic data (A1), and determining means (26) compares the reference characteristic value (H1) with the comparison subject characteristic values (H2, H3) then determines the authentication of the copied electronic data (B2) and/or the recopied electronic data (A2).

In this case, the authentication of the copied electronic data (B2) and/or the recopied electronic data (A2) can be determined by comparing a reference characteristic value (H1) attached to copied electronic data (B2(T)) with comparison subject characteristic values (H2, H3) calculated from copied electronic data (B2) and/or recopied electronic data (A2) with this electronic data management system (10). Therefore the authentication of the copied electronic data (B2) and/or the recopied electronic data (A2) can be managed securely, and the system configuration can be even more extensively simplified compared to the system with the authentication management functions, etc. installed in each computer system.

The computer systems above are classified into a management computer system (12) in which the reference characteristic value extracting means, the comparison subject characteristic value calculating means, and the determination means are installed, and a managed computer system (14) is provided which does not belong to the management computer system (12). Sources of the copied electronic data (B2) and/or the recopied electronic data are managed in the management computer system (12).

Therefore in the case where the copied electronic data (B2) and/or the recopied electronic data (A2) are not authenticated according to sources of the copied electronic data (B2) and/or the recopied electronic data (A2), one of the management computer system (12) or the managed computer system (14) is used in changing the electronic data.

In this case, the management computer system (12) can also be provided with reference characteristic value attaching means (22), that attaches the reference characteristic value (H1) calculated from the original electronic data (A1) to the original electronic data (A1).

Each item of electronic data (A1, A2, B2) is electronic drawing data, and each characteristic value (H1, H2, H3) can be provided as a hash value calculated from graphic information included in each item of electronic drawing data.

The management computer system (12) is a customer's computer system for placing orders for products based on electronic drawing data provided as the original electronic data (A1). The managed computer system (14) is a manufacturer's computer system for manufacturing products for which an order was placed by the customer's computer system (12) and for delivering the manufactured products (M). The managed computer system (14) is a manufacturer's computer system for manufacturing products for which an order is placed by the customer's computer system (12) and for delivering the manufactured products (M). The customer computer system (12) includes means for determining whether or not the products (M) and electronic drawing data (A2, B2) correspond to each other by comparing the recopied electronic data (A2) outputted from the customer computer system (12) and/or the electronic drawing data provided as copied electronic data (B2) outputted from the manufacturer computer system (14) and the products (M) delivered from the manufacturer computer system (14).

Therefore whether or not the products (M) are defective can be managed securely in the customer computer system (12).

The reference characteristic value (H1) is encrypted or processed by electronic water-mark technology and embedded in the electronic data (A1(T), B2(T)). Therefore no computer system other than the specified computer systems (management computer system (12), customer computer system (12)) can change the content of the reference characteristic value (H1) and the authenticity of the copied electronic data (B2) and/or the recopied electronic data (A2) can therefore be managed securely.

An electronic data management method of the present invention is an electronic data management method for storing original data at the customer computer system (12) and outputting the original electronic data (A1) as drawing data for the ordered products to a manufacturer computer system (14) comprises a process for outputting the original electronic drawing data (A1(T1)) with an attached reference characteristic value (H1) previously calculated from the graphic information of the original electronic drawing data (A1), a process for extracting the reference characteristic value (H1) from the copied electronic drawing data (A1 (T1)) of the original electronic drawing data (A1(T)), a process for calculating reference characteristic value (H2) from the stored graphic information of the recopied electronic drawing data (A2) of the original electronic drawing data (A1), and a process for determining whether or not either of the copied electronic drawing data (B2) or the recopied electronic drawing data (A2) is altered by comparing the reference characteristic value (H1) with the comparison subject characteristic value (H2).

Therefore the authenticity of the copied electronic drawing data (B2) and the recopied electronic drawing data (A2) can be managed securely, and the electronic data management method with simplified configuration will be available.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
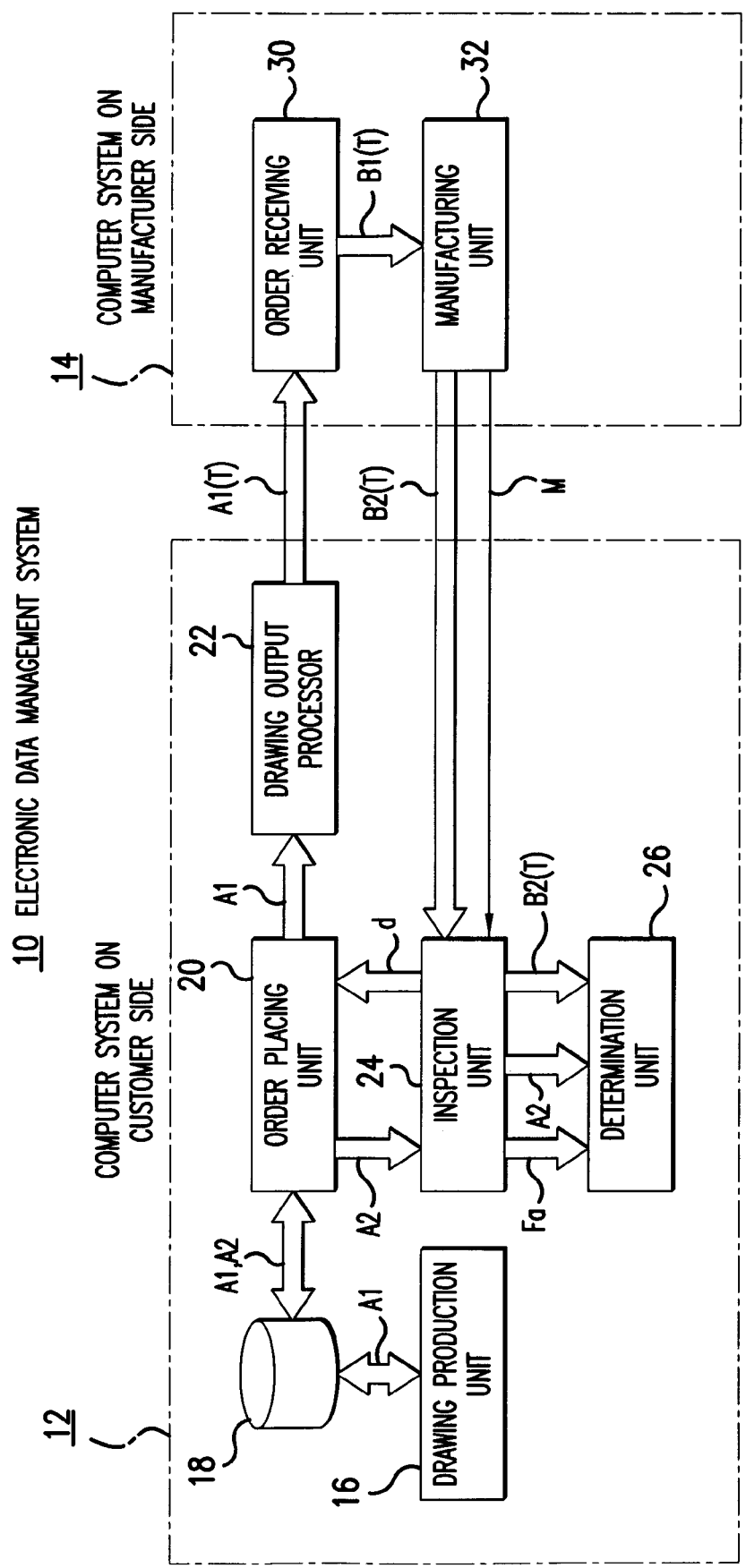
FIG. 1 is a block view of a configuration for an electronic data management system of a first embodiment of the present invention.

The following is a description with reference to the drawings of the preferred embodiments of the present invention. FIG. 1 is a block view of a configuration for an electronic data management system (10) of a first embodiment of the present invention.

The electronic data management system 10 is for using electronic drawing data as electronic data mutually at a customer side and at manufacturer side, and comprises the customer computer system 12 on the customer side and the manufacturer computer system 14 on the manufacturer side. The customer computer system 12 and manufacturer computer system 14 can be configured with a plurality of computer systems.

The customer computer system 12 comprises a drawing production unit 16, a storage device (storage means) 18, an order placing unit 20, a drawing output processor (reference characteristic value attaching means) 22, an inspection unit 24, and a determination unit (reference characteristic value extracting means and determination means) 26. The manufacturer computer system 14 comprises an order receiving unit 30 and a manufacturing unit 32.

The drawing production unit 16 of the customer computer system 12 produces the drawing for the product being ordered, and outputs the produced drawing to the storage device 18 as original electronic drawing data (hereafter referred simply as original data). The storage device 18 comprises storage media such as memory elements, a hard disk, or a laser disc and stores the original data A1 calculated from the drawing production unit 16 in the storage media. Original data A1(T) with a tag T attached, as described later, can be stored in the storage device 18.

The order placing unit 20 reads out the original data A1 from the storage device 18, and outputs the original data A1 to the drawing output processor 22 as the drawing for the product being ordered.

Figure 2:
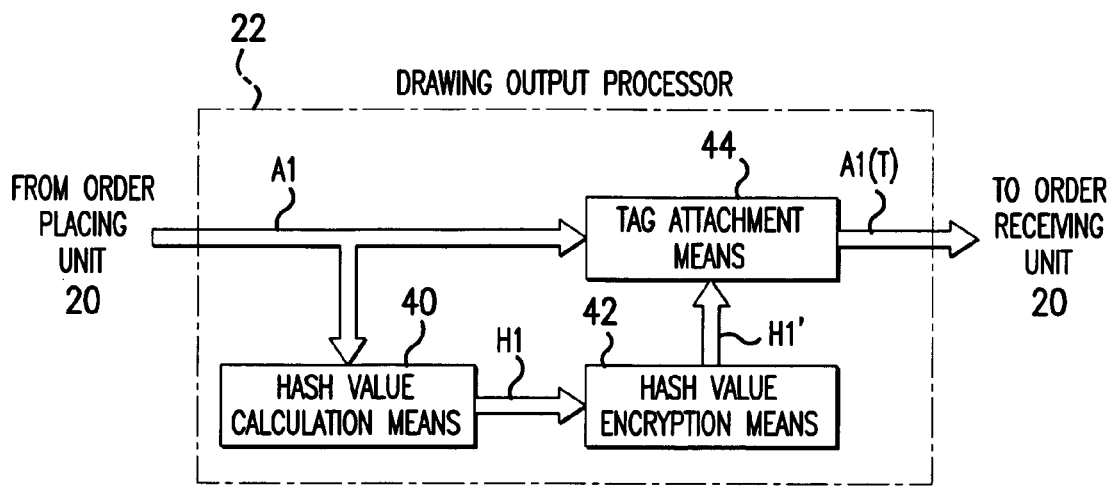
FIG. 2 is a block diagram of a configuration of a drawing output processor.

FIG. 2 is a block diagram of a configuration for the drawing output processor 22. The drawing output processor 22 comprises hash value calculation means 40, hash value encryption means 42, and tag attachment means 44.

The original data A1 outputted from the order placing unit 20 is supplied to the hash value calculation means and the tag attachment means 44.

The hash value calculation means 40 calculates the reference hash value H1 as a reference characteristic value from graphic information such as lines, points, dimensions, finish marks, etc., and management information such as the title of the drawing, name of the drafter, and revision date, etc.

The hash value encryption means 42 encrypts the reference hash value H1 calculated by the hash value calculation means 40, and calculates an encrypted reference hash value H1'.

In this case, the encryption process is performed using encryption methods such as the methods employed by PGP (Pretty Good Privacy), etc.

The hash value encryption means 42 encrypts the reference hash value H1 calculated by the hash value calculation means 40, and calculates the encrypted reference hash value H1'. When "CATIA" (software from Dassault systems) is used for producing the drawings, the encrypted reference characteristic hash value H1' is preferably converted into hexadecimal numbers and capitalized, and then embedded in the original data A1 in order to maintain compatibility with the functions of "CATIA".

In this case, the reference hash value H1' included in the tag T is encrypted, and the tag T is embedded in the original data A1 after being processed with electronic water-mark technology (technology for embedding a water-mark into an original image, where a water-mark embedded in an original image is created in a manner which is indistinguishable with the naked eye from the original image), etc. It is therefore not possible for any system other than the drawing output processor 22 and the determination unit 26 of the customer computer system 12 to confirm the existence of the tag T, or determine or change the content of the tag T.

The tag attachment means 44 outputs the original data A1(T) including the tag T to the order receiving unit 30 of the manufacturer computer system 14 as drawing data for the product being ordered. Here, the character "(T)" describes that the tag T is embedded in the original data A1.

As described in FIG. 1, when the order receiving unit 30 receives the original data A1(T) from the customer computer system 12, the order receiving unit 30 determines the content of the original data A1(T) (the content of the order received), and outputs the copied electronic data B1(T) (hereinafter referred as copied data on the manufacturer side) copied at the order receiving unit 30 to the manufacturing unit 32.

Regarding the possibility of the change of the content of the original data A1 with the exception of the tag T made at the order receiving unit 30, the numeral used to describe the copied data on the manufacturer side outputted from the order receiving unit 30 will now be changed from "A1" to "B1". Similarly, changes of "A1" to "A2", and "B1" to "B2" will also be made.

The numeral "A" describes that the source of the electronic drawing data is the customer computer system 12, and the numeral "B" describes that the source of the electronic drawing data is the manufacturer computer system 14.

The manufacturing unit 32 manages the manufacture of the product (controls the production process) according to the copied data on the manufacturer side B1(T) outputted from the order receiving unit 30.

Then the manufacturing unit 32 delivers the manufactured product M to the customer, and outputs the copied data on the manufacturer side B2(T) copied from the copied data on the manufacturer side B1(T) used for the manufacturing of the product M to the inspection unit 24 of the customer computer system 12.

When the inspection unit 24 receives the product M and the copied data on the manufacturer side B2(T) from the manufacturer computer system 14, the inspection unit 24 outputs the command d that requires the supply of the electronic drawing data A2 (the recopied electronic drawing data (hereafter referred as copied data on the customer side) recopied from the original data by the customer), which corresponds to the product M and the copied data on the manufacturer side B2(T).

The copied data on the customer side A2 read out from the storage device 18 according to the command d is transferred from the order placing unit 20 to the inspection unit 24.

The inspection unit 24 then determines whether or not the product M is defective by comparing the copied data on the customer side A2 and the copied data on the manufacturer side B2(T) outputted from the manufacturer computer system 14 with the product M.

In this case, the inspection unit 24 manages the source of the copied data on the customer side A2 and the copied data on the manufacturer side B2(T).

Figure 3:
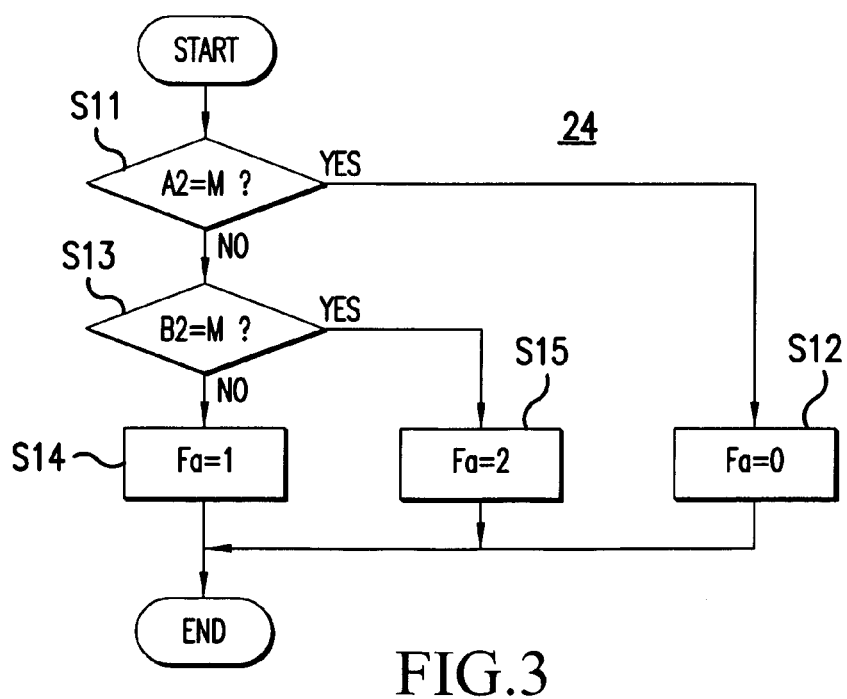
FIG. 3 is a flowchart showing a determination process executed in an inspection unit constituting the electronic data management system described in FIG. 1, for determining whether or not a product is defective.

FIG. 3 is a flowchart showing a determination process executed in an inspection unit 24 for determining whether or not the product M is defective.

In step S11, the inspection unit 24 compares the copied data on the customer side A2 with the product M (A2=M?).

In this step, the copied data on the customer side A2 and the product M are compared by utilizing the three-dimensional geometry measuring apparatus, for example, the apparatus for measuring the shape of the surface of the product M by scanning the surface of the product M with means such as an inspection needle, or laser beam, etc.

When the copied data on the customer side A2 and the product M is confirmed to coincide in this step S11 (YES), the value of the flag Fa describing the condition of the product M in the step S12 is set to Fa=0 to show that the product M is not defective.

When the copied data on the customer side A2 and the product M is confirmed not to coincide in this step S11 (NO), the process proceeds to step S13.

In step S13, the inspection unit 24 compares the copied data on the manufacturer side B2(T) (copied data B2 on the manufacturer side B2 practically) with the product M in a similar process executed in step S11 (B2=M?).

When it is confirmed that the copied data on the manufacturer side B2(T) and the product M does not coincide in step S13 (NO), (i.e. the product M does not correspond to neither either of the copied data on the customer side A2 or the copied data on the manufacturer side B2(T)), the value of the flag Fa in the step S14 will be set as Fa=1 to show that the product M is defective.

When it is confirmed that the copied data on the manufacturer side B2(T) and the product M coincide in step S13 (YES), the value of the flag Fa in the step S15 is set as Fa=2 to show that whether or not the product M is defective has not yet been determined.

When the processing of steps S11 to S15 is complete, the inspection unit 24 supplies the value of the flag Fa that describes the condition of the product M, the copied data on the customer side A2, and the copied data on the manufacturer side B2(T) to the determination unit 26 as described in FIG. 1.

Figure 4:
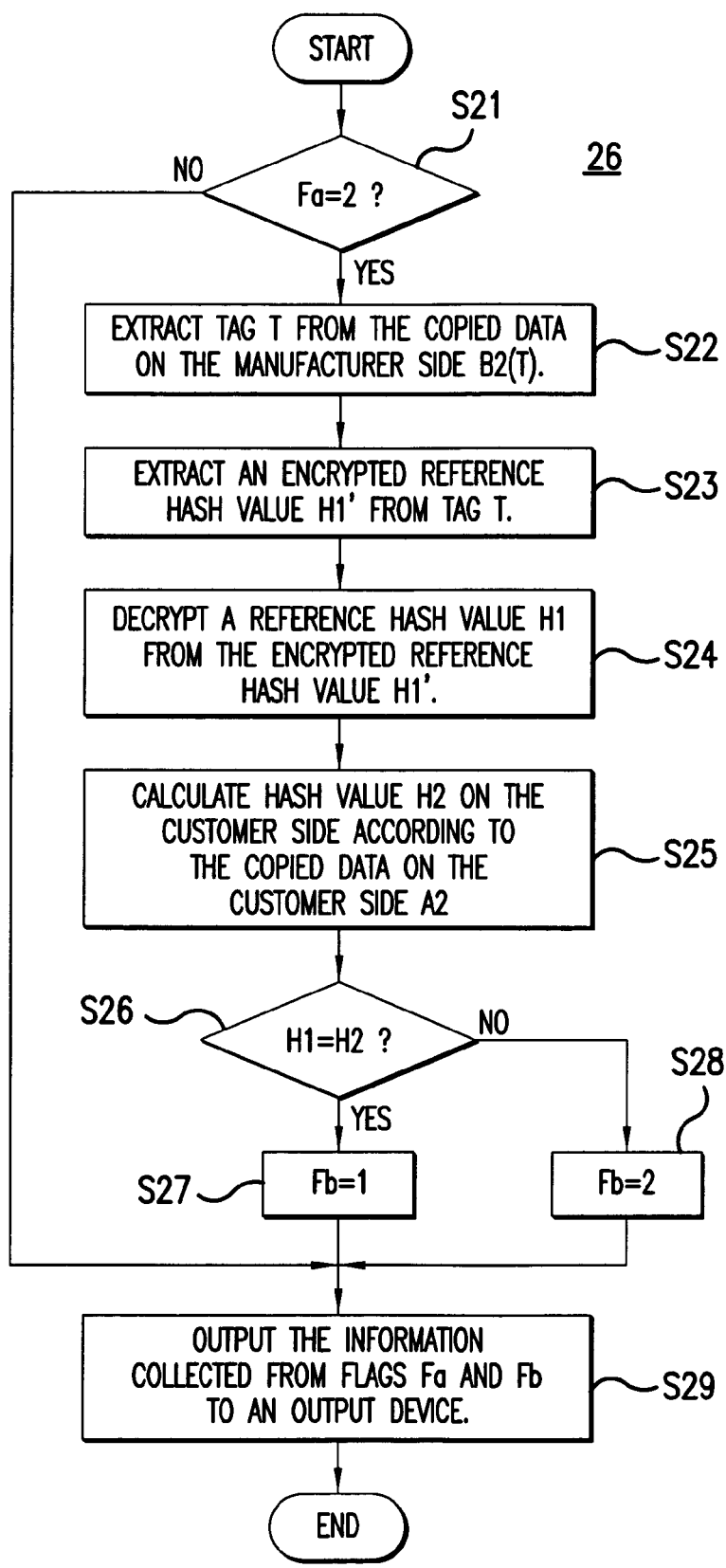
FIG. 4 is a flowchart showing a determination process executed in a determination unit constituting the electronic data management system described in FIG. 1, for determining whether or not the content of the electric drawing data has been changed.

When the determination unit 26 receives the flag Fa from the inspection unit 24, the copied data on the customer side A2 and the copied data B2(T) on the manufacturer side, the determination unit 26 determines whether or not any changes are made on the contents of either of the copied data on the customer side A2 or the copied data on the manufacturer side B2(T) as described in the flowchart shown in FIG. 4.

In step S21, the determination unit 26 confirms whether or not the value of the flag Fa is set to Fa=2 showing that whether or not the product M is defective has not yet been determined. When the value of the flag Fa is set as Fa=2 (YES), the process proceeds to the next step S22, and when the flag Fa is not set as Fa=2 (i.e. Fa=0 or Fa=1) (NO), the process is forwarded to step S29 as described later.

In the step S22, the determination unit 26 extracts the tag T attached by the drawing output processor 22 from the copied data on the manufacturer side B2(T). Then in step S23, the determination unit 26 extracts the encrypted reference hash value H1' from the tag T, proceeds to step S24, and decodes the reference hash value H1 from the encrypted reference hash value H1', i.e. these processes executed in these steps S22 to S24 have the function of the reference characteristic value extracting means for extracting the reference hash value H1 as the reference characteristic value from the copied data B2 on the customer side B2(T).

In the following step S25, the determination unit 26 calculates the hash value on the customer side H2 as a comparison subject characteristic value from the copied data on the customer side A2. i.e. the process executed in this step S25 has the function of the comparison subject characteristic value calculating means for calculating the hash value on the customer side H2 as the comparison subject characteristic value from the copied data on the customer side A2 for comparison with the reference hash value H1.

In the following step S26, the determination unit 26 compares the reference hash value H1 extracted in the step S24 with the hash value on the customer side H2 calculated in step S25.

When it is confirmed that the reference hash value H1 and the hash value on the customer side H2 coincide in step S26 (YES), the value of the flag Fb describing the authenticity of the copied data on the customer side A2 and the copied data on the manufacturer side B2(T) in the step S27 are set as Fb=1 to show that changes were made on the copied data on the manufacturer side B2(T).

This result can be obtained as follows; when the reference hash value H1 and the hash value on the customer side H2 coincide, the original data A1 and the copied data on the customer side A2 can be determined to coincide. When the product M and the copied data on the manufacturer side B2(T) coincide (step S14 in FIG. 3) when the product M and the copied data on the customer side A2 do not coincide (the step S12 in FIG. 3), the copied data on the manufacturer side B2(T) is regarded to have been changed in the manufacturer computer system 14.

When the reference hash value H1 and the hash value on the customer side H2 are confirmed not to coincide in step S26 (NO), the value of the flag Fb in the following step S28 is set to Fb=2 to show that changes were made to the copied data on the customer side A2.

This result can be obtained as follows; when the reference hash value H1 and the hash value on the customer side H2 do not coincide, for example, the original data A1 (the copied data on the customer side A2) stored in the storage device 18 can be considered to have been changed, for example, by the drawing output processor 16 of the customer computer system 12.

Therefore the process executed in the step S26 functions as a determination means for determining the authenticity of the copied data on the customer side A2 by comparing the reference hash value H1 with the hash value on the customer side H2.

In the following step S29, the determination unit 26 outputs information based on the value of the flag Fb set in steps S27 and S28 and the value of the flag Fa set by the inspection unit (the information such as whether or not the product M is defective, the copied data on the customer side A2 and the copied data on the manufacturer side B2 coincides with the original data A1 (whether or not this data is authentic), and the source where the change has been made when the copied data on the customer side A2 and the copied data on the manufacturer side B2 are not authenticated) to the output device such as display device which doesn't show the drawing, and to a printer, etc. The output device outputs the information of the defectiveness of the product M, and the authenticity of each item of electronic drawing data A1, A2, B1, B2, etc.

Figure 5:
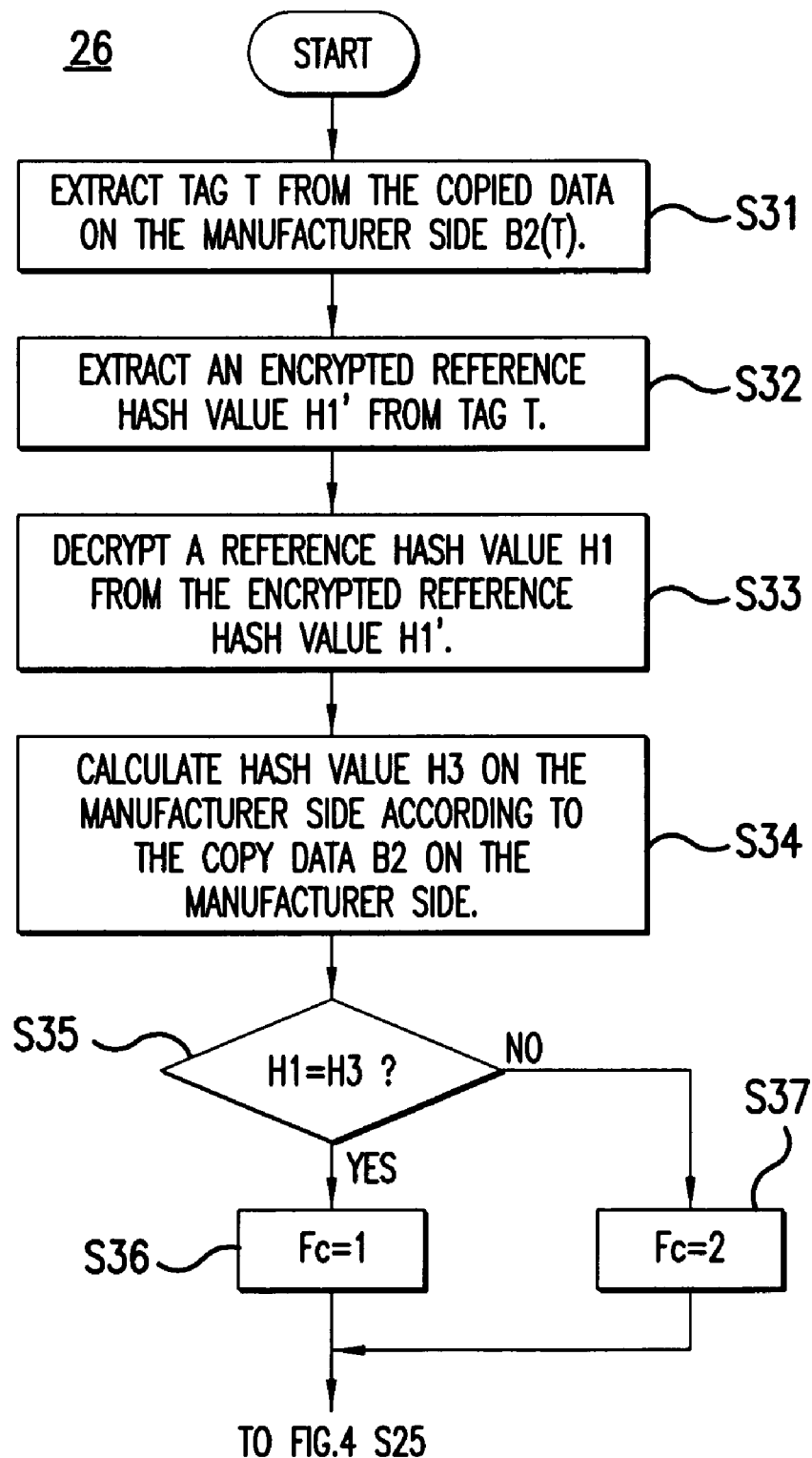
FIG. 5 is a flowchart showing a determination process executed in a determination unit constituting the electronic data management system described in FIG. 1, for determining whether or not the content of the electric drawing data has been changed.

Such a configuration can also be provided wherein the determination unit 26 calculates the hash value of the copied data on the manufacturer side B2, and determines if any change has been made to the copied data on the manufacturer side B2 by comparing the hash value with the reference hash value H1 (the reference hash value H1 attached to the copied data on the manufacturer side B2) calculated in the step S24. The following is a detailed description of this process with reference to the flowchart shown in FIG. 5.

The inspection unit 26 executes the similar process to the step S22 to S24 in FIG. 4 in the step S31 to S33 (reference characteristic value extracting means). Thus the reference hash value H1 will be extracted from the copied data on the manufacturer side B2(T) and restored.

Then, in step S34 (the comparison object original value calculating means), the determination unit 26 calculates the hash value on the manufacturer side H3 as the comparison object original value from the copied data on the manufacturer side B2 (T). In this case, the determination unit 26 removes the tag T attached by the drawing output processor 22 from the copied data on the manufacturer side B2(T), and calculates the hash value on the manufacturer side H3.

In step S35 (the determination means), the determination unit 26 compares the reference hash value H1 calculated in the step S33 with the hash value on the manufacturer side H3 calculated in step S34 (H1=H3?).

When the reference hash value H1 and the hash value on the manufacturer side H3 are confirmed to coincide in step S35 (YES), the value of the flag Fc in the following step S36 describing the authenticity of the copied data on the manufacturer side B2 is set as Fc=1 to show that no changes have been made to the copied data on the manufacturer side B2.

When it is confirmed that the reference hash value H1 and the hash value on the manufacturer side H3 do not coincide in step S35 (NO), the value of the flag Fc in the following step 37 describing the authenticity of the copied data on the manufacturer side B2 is set as Fc=2 to show that changes are made to the copied data on the manufacturer side B2.

Moreover, by executing the process of steps S25 to S28 in FIG. 4 after steps S36 or S37, whether or not the copied data has been changed on the customer side A2 can also be determined. Therefore whether or not both/either of the copied data on the customer side A2 and/or the copied data on the manufacturer side B2 has/have been changed can be determined.

The electronic data management system 10 in the embodiment of the present invention is therefore capable of determining the authenticity of copied data on the customer side A2 and the copied data B2 on the manufacturer side B2 by comparing the reference hash value H1 based on the original data A1 attached to the copied data on the manufacturer side B2(T) with the hash value on the customer side H2 calculated from the copied data on the customer side A2 and the hash value on the manufacturer side H3 calculated from the copied data on the manufacturer side B2. Therefore the authenticity of the copied data on the customer side A2 and the copied data on the manufacturer side B2 can be managed securely. Moreover, the configuration can be drastically simplified compared to the system for example in which the authentication management functions are installed in each computer system (the computer system on the customer side 12 and the computer system on the manufacturer side 14).

Further, as the sources of the copied data on the customer side A2 and the copied data on the manufacturer side B2 are managed in the computer system on the customer side 12, the computer system on the customer side 12 is capable of specifying in which of the computer system on the customer side 12 or the computer system on manufacture side 14 a change to the copied data on the customer side A2 and the copied data on the manufacturer side B2 has been made.

The reference hash value H1 is encrypted and embedded in the original data A1 as the tag T by use of the electronic water-mark technology, so that no system other than the computer system on the customer side 12 and especially the drawing output processor 22 and the determination unit 26, can confirm the existence of the tag T, or determine or change the contents of the tag T. Therefore the authenticity of the copied data on the customer side A2 and the copied data on the manufacturer side B2 can be managed securely.

The electronic data management system 10 in the embodiment of the present invention can also be applied to electronic data management systems for managing various sorts of electronic data other than the electronic drawing data.

The present invention enables the accurate determination of the authenticity of electronic data, and enables the computer system used in changing electronic data to be specified in cases where electronic data is found to be not authenticated, while retaining a simple configuration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic data management system for using electronic data mutually among a plurality of computer systems classified into at least a first computer system and a second computer system, the first computer system and the second computer system being in communication with each other, the first computer system comprising:
    reference characteristic value extraction means for extracting a reference characteristic value from a copy of electronic data attached with a reference characteristic value obtained from original electronic data, the copied electronic data attached with the reference characteristic value being generated by and transmitted from the second computer system and received by the first computer;
    comparison subject characteristic value calculating means for calculating a comparison subject characteristic value from the copied electronic data and recopied electronic data from the original electronic data from the first computer system; and
    determination means for determining authenticity of the copied electronic data from the second computer system and the recopied electronic data from the first computer system by comparing the reference characteristic value and the comparison subject characteristic value,
    wherein the copied electronic data transmitted from the second computer system to the first computer system is capable of being compared with three-dimensional geometry of a manufactured product only by using a laser beam of the first computer system.

2. The electronic data management system according to claim 1,
    wherein the first computer is a management computer system provided with the reference characteristic value extraction means, the comparison subject characteristic value calculating means, and the determination means, and
    the second computer system is a managed computer system not belonging to the management computer system,
    wherein a source of the copied electronic data and the recopied electronic data is managed by the management computer system.

3. The electronic data management system according to claim 2, the first computer system being provided with reference characteristic value attaching means for attaching the reference characteristic value calculated based on the original electronic data to the original electronic data and sending the reference characteristic value to the second computer.

4. The electronic data management system according to claim 3, wherein the management computer system is the computer system on a customer side for placing orders for manufacture of a product based on electronic drawing data, the electronic drawing data being the original electronic data,
    wherein the managed computer system is the computer system on a manufacturer side for manufacturing the product ordered by the management computer system on the customer side, and
    wherein the management computer system is provided with the determination means for determining whether or not the product and the electronic drawing data coincide by comparing the electronic drawing data taken as the copied electronic data sourced from the management computer system on the customer side, and the electronic drawing data taken as the copied electronic data sourced from the managed computer system with the product delivered by the managed computer system.

5. The electronic data management system according to claim 3, wherein the reference characteristic value is embedded in the original, the copied, and the recopied electronic data utilizing electronic water-mark technology.

6. The electronic data management system according to claim 2,
    wherein the management computer system is the computer system on a customer side for placing orders for manufacture of a product based on electronic drawing data, the electronic drawing data being the original electronic data,
    wherein the managed computer system is the computer system on a manufacturer side for manufacturing the product ordered by the management computer system on the customer side, and
    wherein the management computer system is provided with the determination means for determining whether or not the product and the electronic drawing data coincide by comparing the electronic drawing data taken as the copied electronic data sourced from the management computer system on the customer side, and the electronic drawing data taken as the copied electronic data sourced from the managed computer system with the product delivered by the managed computer system.

7. The electronic data management system according to claim 2, wherein the reference characteristic value is embedded in the original, the copied, and the recopied electronic data utilizing electronic water-mark technology.

8. The electronic data management system according to claim 1, wherein each item of the original, the copied, and the recopied electronic data is electronic drawing data, and each characteristic value is a hash value calculated based on graphic information included in each item of the electronic drawing data.

9. The electronic data management system according to claim 8, wherein the reference characteristic value is embedded in the original, the copied, and the recopied electronic data utilizing electronic water-mark technology.

10. The electronic data management system according to claim 1, wherein the reference characteristic value is encrypted and embedded in the original, the copied, and the recopied electronic data.

11. The electronic data management system according to claim 1, wherein the determination means determines the authenticity of the recopied electronic data.

12. The electronic data management system according to claim 1, wherein the recopied electronic data is generated by the first computer system.

13. The electronic data management system according to claim 1, wherein the reference characteristic value is embedded in the original, the copied, and the recopied electronic data utilizing electronic water-mark technology.

14. An electronic data management method for storing original electronic drawing data and outputting the original electronic drawing data as the drawing data of a manufactured product to be ordered from a manufacturer, comprising the steps of:
providing a first computer system at a customer and a second computer system at the manufacturer, the first and the second computer systems being in communication with each other;
calculating a reference characteristic value in the first computer system from graphic information of the original electronic drawing data in advance and outputting the original electronic drawing data affixed with a reference characteristic value from the first computer system to the second computer system of the manufacturer; and
determining in the first computer system whether or not one or both of the copied electronic drawing data received from the second computer system and recopied electronic drawing data outputted from the first computer system have been altered by comparing the reference characteristic value with the comparison object original value,
wherein the determining step includes the step of:
comparing the copied electronic drawing data received by the first computer system and the manufactured product by a three-dimensional geometry measuring process using an inspection needle.

15. The electronic data management method according to claim 14, wherein the determining step is capable of being performed only on the first computer system, thereby determining the authenticity of the copied electronic drawing data received from the second computer system.

16. The electronic data management method according to claim 15, wherein the determining step is capable of being performed only on the first computer system, thereby determining the authenticity of the recopied electronic drawing data, the recopied data being generated on the first computer system.

17. The electronic data management method according to claim 14, wherein the determining step is performed on the first computer system, thereby determining the authenticity of the copied electronic drawing data received from the second computer system.

18. An electronic data management system for using electronic data mutually among a plurality of computer systems classified into at least a first computer system and a second computer system, the first computer system and the second computer system being in communication with each other, the first computer system comprising:
reference characteristic value extraction means for extracting a reference characteristic value from a copy of electronic data attached with a reference characteristic value obtained from original electronic data, the copied electronic data attached with the reference characteristic value being generated by and transmitted from the second computer system and received by the first computer;
comparison subject characteristic value calculating means for calculating a comparison subject characteristic value from the copied electronic data and recopied electronic data from the original electronic data; and
determination means for determining authenticity of the copied electronic data and the recopied electronic data by comparing the reference characteristic value and the comparison subject characteristic value,
wherein the copied electronic data transmitted from the second computer system to the first computer system is compared with three-dimensional geometry of a manufactured product by using an inspection needle or laser beam of the first computer system.

* * * * *